(12) United States Patent
Onishi et al.

(10) Patent No.: US 8,581,941 B2
(45) Date of Patent: *Nov. 12, 2013

(54) BACKLIGHT DEVICE AND DISPLAY APPARATUS

(75) Inventors: Toshiki Onishi, Osaka (JP); Hideyuki Nakanishi, Osaka (JP); Takahiro Kobayashi, Osaka (JP); Yoshio Umeda, Hyogo (JP); Akihiro Yamamura, Osaka (JP); Seiji Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

This patent is subject to a terminal disclaimer.

(21) Appl. No.: 13/203,213

(22) PCT Filed: Sep. 29, 2010

(86) PCT No.: PCT/JP2010/005861
§ 371 (c)(1),
(2), (4) Date: Aug. 24, 2011

(87) PCT Pub. No.: WO2011/040011
PCT Pub. Date: Apr. 7, 2011

(65) Prior Publication Data
US 2012/0013652 A1 Jan. 19, 2012

(30) Foreign Application Priority Data
Oct. 2, 2009 (JP) .................. 2009-230734

(51) Int. Cl.
*G09G 5/10* (2006.01)
(52) U.S. Cl.
USPC .............................. 345/690; 345/102; 345/204
(58) Field of Classification Search
USPC .................. 345/102, 55, 84, 87, 204, 690
See application file for complete search history.

(56) References Cited

U.S. PATENT DOCUMENTS 6,683,657 B1 1/2004 Miyawaki
7,113,164 B1 * 9/2006 Kurihara ................. 345/102

(Continued)

FOREIGN PATENT DOCUMENTS

JP 06-160811 6/1994
JP 2001-100699 4/2001

(Continued)

OTHER PUBLICATIONS

A design for an RGB LED driver with independent PWM control and fast settling time by Awo Dede O Ashiabor, Master dissertation, Dept. of Electrical Engineering and Computer Science, Massachusetts Institute of Technology, published May 2007.*

*Primary Examiner* — Quan-Zhen Wang
*Assistant Examiner* — Chun-Nan Lin
(74) *Attorney, Agent, or Firm* — Hamre, Schumann, Mueller & Larson, P.C.

(57) ABSTRACT

Provided is a backlight device wherein when the drive duty and the drive current are controlled according to a motion, the image quality is improved by preventing flicker caused by the change of the drive waveform. A light-emitting unit (121) comprises a plurality of light-emitting areas. A motion amount detecting unit (131) detects the motion amount of an image in each of a plurality of motion areas each corresponding to at least one or more light-emitting areas. A drive condition specifying unit specifies a drive condition including the duty and pulse height value of a drive pulse for causing each of the plurality of light-emitting areas to emit light, on the basis of the detected motion amount. A drive unit drives each of the plurality of light-emitting areas according to the specified drive condition. The drive condition specifying unit adjusts the drive condition such that the drive condition temporally smoothly changes.

9 Claims, 13 Drawing Sheets

(56) References Cited

U.S. PATENT DOCUMENTS

| | | | |
|---|---|---|---|
| 8,068,087 B2 * | 11/2011 | Feng | 345/102 |
| 8,248,361 B2 * | 8/2012 | Inada et al. | 345/102 |
| 8,314,767 B2 * | 11/2012 | Feng et al. | 345/102 |
| 2001/0043179 A1 | 11/2001 | Yoshinaga et al. | |
| 2001/0052891 A1 * | 12/2001 | Yoshihara et al. | 345/102 |
| 2002/0067332 A1 | 6/2002 | Hirakata et al. | |
| 2005/0062681 A1 | 3/2005 | Honbo | |
| 2005/0184952 A1 | 8/2005 | Konno et al. | |
| 2005/0248520 A1 * | 11/2005 | Feng et al. | 345/87 |
| 2005/0248553 A1 * | 11/2005 | Feng et al. | 345/204 |
| 2005/0248554 A1 * | 11/2005 | Feng et al. | 345/204 |
| 2005/0248555 A1 * | 11/2005 | Feng et al. | 345/204 |
| 2005/0248593 A1 * | 11/2005 | Feng et al. | 345/690 |
| 2006/0007107 A1 * | 1/2006 | Ferguson | 345/102 |
| 2006/0038771 A1 * | 2/2006 | Hirakata et al. | 345/102 |
| 2006/0202945 A1 * | 9/2006 | Feng | 345/102 |
| 2006/0274026 A1 * | 12/2006 | Kerofsky | 345/102 |
| 2006/0279523 A1 * | 12/2006 | Nitta et al. | 345/102 |
| 2006/0284822 A1 * | 12/2006 | Kerofsky et al. | 345/102 |
| 2007/0182700 A1 | 8/2007 | Baba et al. | |
| 2007/0285382 A1 * | 12/2007 | Feng | 345/102 |
| 2008/0038771 A1 * | 2/2008 | Taylor et al. | 435/40.5 |
| 2008/0042968 A1 * | 2/2008 | Oh | 345/102 |
| 2008/0209551 A1 * | 8/2008 | Treacy et al. | 726/22 |
| 2009/0102783 A1 | 4/2009 | Hwang et al. | |
| 2009/0122087 A1 * | 5/2009 | Maruyama et al. | 345/690 |
| 2009/0295706 A1 * | 12/2009 | Feng | 345/102 |
| 2010/0002009 A1 | 1/2010 | Takata | |
| 2010/0052575 A1 * | 3/2010 | Feng et al. | 315/308 |

FOREIGN PATENT DOCUMENTS

| | | |
|---|---|---|
| JP | 2001-281622 | 10/2001 |
| JP | 2003-050569 | 2/2003 |
| JP | 2006-323300 | 11/2006 |
| JP | 2007-206651 | 8/2007 |
| JP | 2009-134237 | 6/2009 |
| JP | 2009-180934 | 8/2009 |
| WO | WO 2007/072598 | 6/2007 |

* cited by examiner

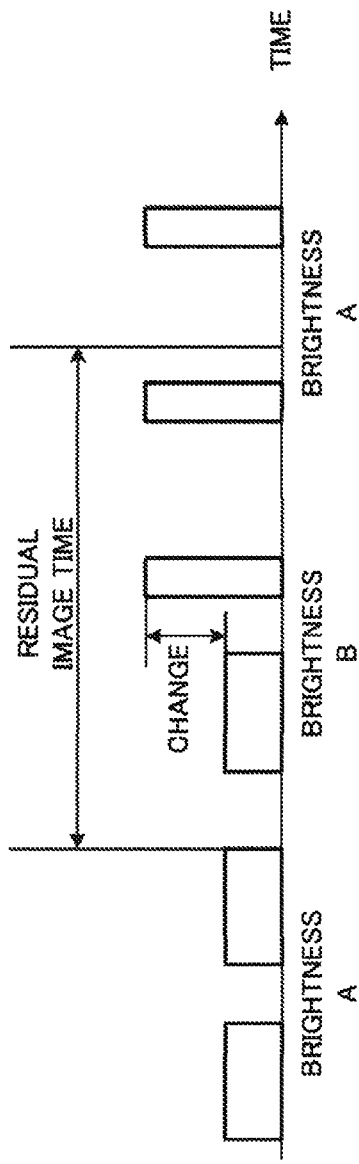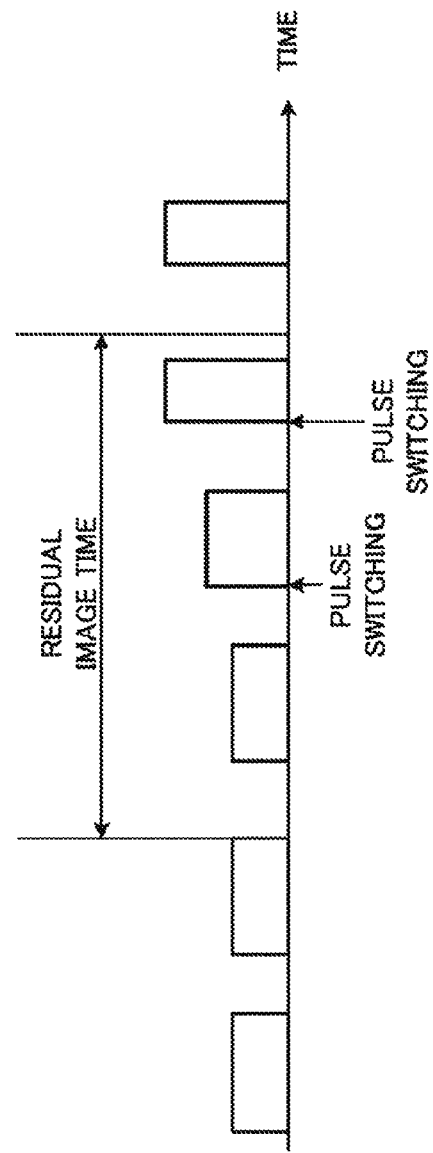
FIG.3A
FIG.3B

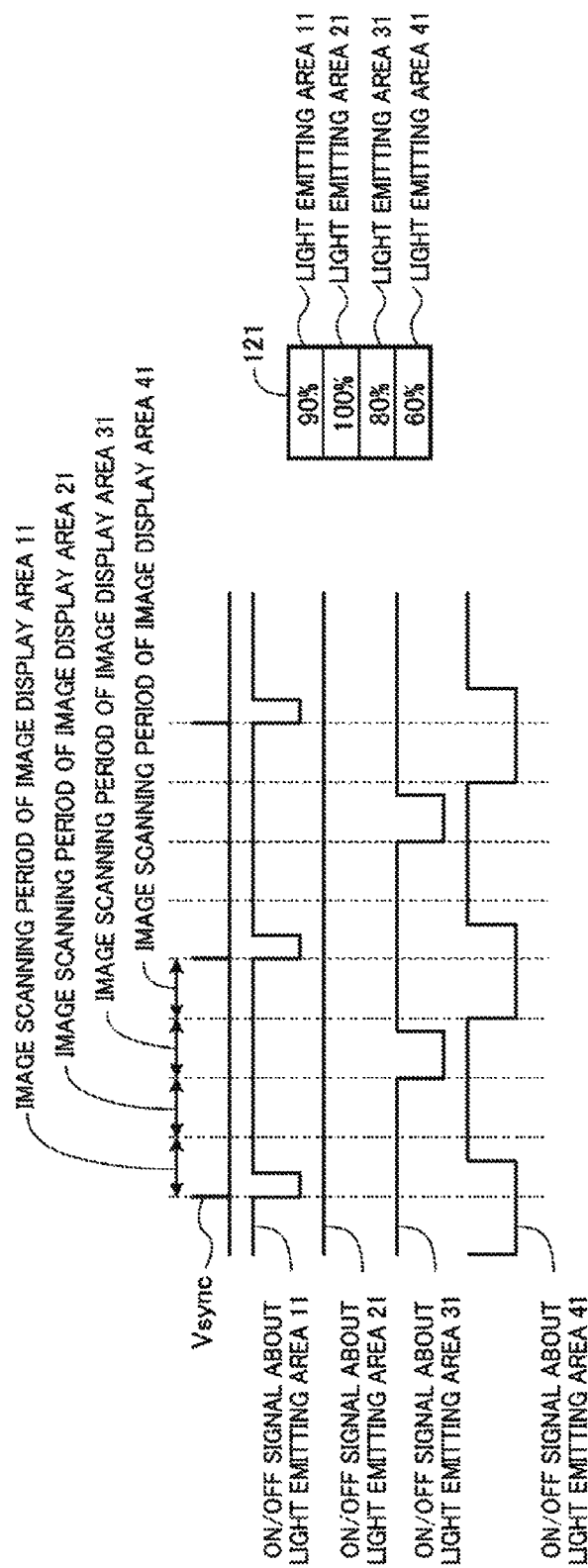

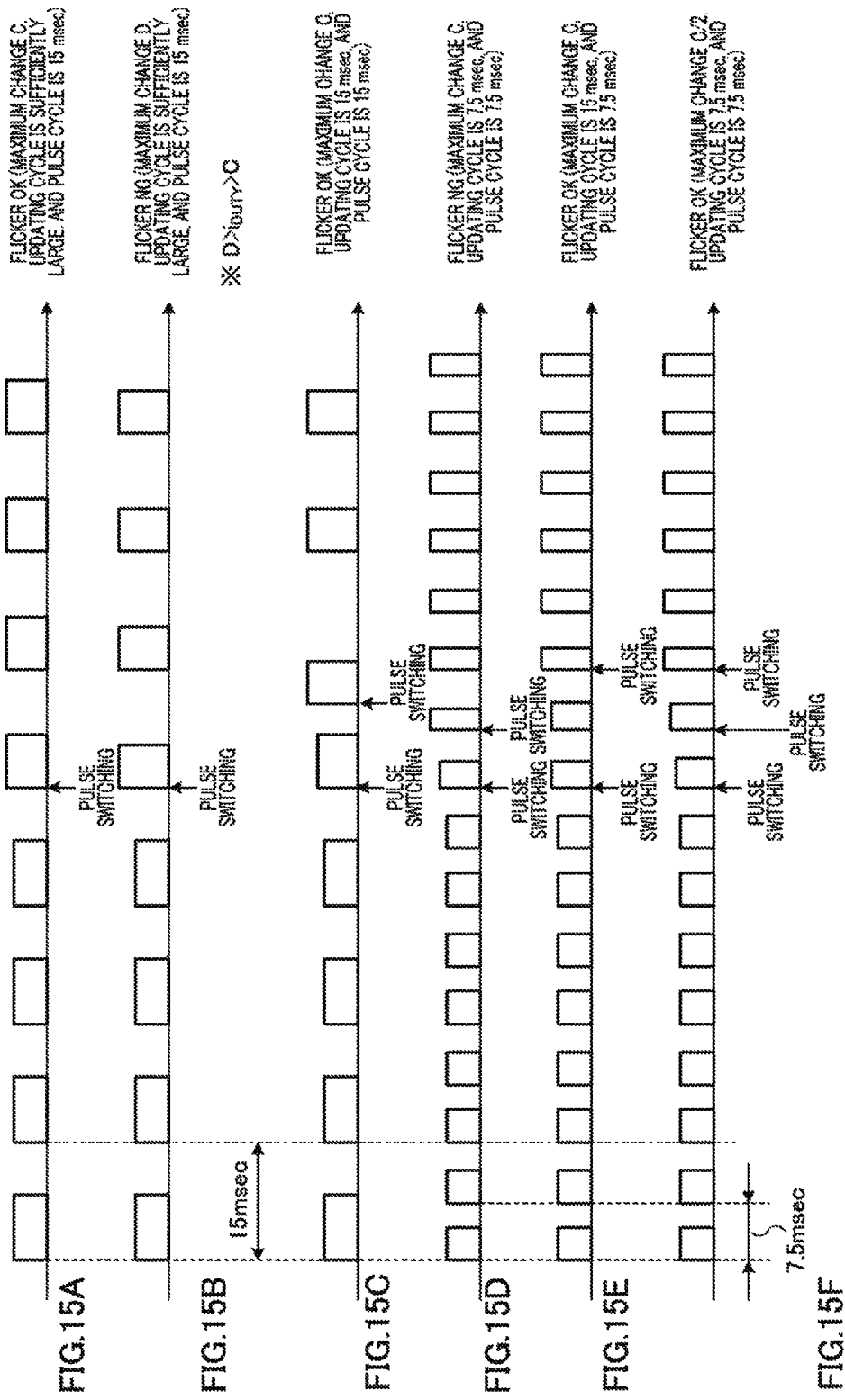

BACKLIGHT DEVICE AND DISPLAY APPARATUS

TECHNICAL FIELD

The present invention relates a backlight apparatus and a display apparatus using the backlight apparatus.

BACKGROUND ART

A non-self-luminous display apparatus typified by a liquid-crystal display apparatus has a backlight apparatus (to be also simply referred to as a "backlight" hereinafter) on a backside thereof. The display apparatus displays an image through a light modulating section that adjusts an amount of reflection or an amount of transmission of light radiated from the backlight depending on an image signal. In the display apparatus, in order to reduce blurring of a moving image appearing in a hold type driving display apparatus, a light source is intermittently lighted in synchronism with scanning of an image.

In general, in order to perform the intermittent lighting, a scheme that causes an entire light emitting area of the backlight to light at a predetermined timing (to be generally referred to as "backlight blink") and a scheme that vertically divides the light emitting area of the backlight into a plurality of scanning areas as shown in FIG. 1 and causes the scanning areas to sequentially flash in synchronism with scanning of an image as shown in FIG. 2 (to be generally referred to as "backlight scanning") are used.

For example, in a liquid display apparatus using a backlight blink scheme described in Patent Literature 1, it is determined whether an input image is a still image or a moving image, and a driving duty (to be also referred to as a "duty" hereinafter) and a driving current (to be also referred to as a "peak value" hereinafter) of a light source is controlled.

For example, in a liquid display apparatus using a backlight scanning scheme described in Patent Literature 2, driving duties of a light source are controlled in units of scanning areas depending on the magnitude of motion of an image.

CITATION LIST

Patent Literature

PTL 1
Japanese Patent Publication No. 3535799
PTL 2
Japanese Patent Application Laid-Open No. 2006-323300

SUMMARY OF THE INVENTION

Solution to Problem

In a liquid crystal display apparatus described in Patent Literature 2, even though an input image is a moving image, when a partial image in a certain image display area corresponding to a certain scanning area does not move, the scanning area is maintained without decreasing the driving duty of the scanning area. To be more specific, when duties of only the other scanning areas are decreased without decreasing a driving duty of the certain scanning area, a moving image resolution can be increased while suppressing blurring of the moving image.

In this case, in order to equally maintain brightness of all the scanning areas, a driving current of a scanning area the driving duty of which is decreased needs to be relatively increased.

However, when a driving duty and a driving current are controlled depending on motion as described above, although an average brightness does not change, a light source is driven by a driving waveform pattern (combination of a driving duty and a driving current changing depending on motion. For this reason, even though driving waveform patterns in which the same brightness are obtained are used, in transition from a certain driving waveform to another driving waveform, a flicker disadvantageously occurs under specific conditions.

In general, it is known that, when a brightness changes by a predetermined quantity or more within a residual image time (about 30 msec) of human eyes, the change in brightness is recognized as a flicker. The present inventor found that, even though driving waveform patterns in which the same brightness are obtained are used, flicker is generated upon change of driving waveforms under specific conditions.

For example, as shown in FIG. 3A, an average brightness of brightnesses obtained after and before a period of transition of driving waveforms is A, a brightness in the period of transition of the driving waveforms diverges from A and becomes B (A(B). Therefore, when the degree of the divergence is large (for example, a change in peak value is large), a brightness changes to A (B (A in the residual image time of human eyes, a brightness changes by a predetermined quantity or more. For this reason, the change in brightness is recognized as a flicker.

As shown in FIG. 3B, driving pulses are smoothly switched (for example, peak values are change smoothly in stages), a switching cycle (interval between timings of pulse switching) is excessively short, the same problem as described above is posed, and the change can be recognized as a flicker.

It is therefore an object of the present invention to provide a backlight apparatus and a display apparatus that prevent flicker caused by change of driving waveforms to make it possible to improve image quality when a driving duty and a driving current are controlled depending on motion.

Solution to Problem

A backlight apparatus according to the present invention includes a light emitting section having a plurality of light emitting areas; a motion amount detecting section that detects the amount of motion of an image in each of a plurality of moving areas corresponding to at least one of the light emitting areas; a driving condition designating section that designates driving conditions including the duty and peak value of a driving pulse to cause the plurality of light emitting areas to emit light based on the detected amount of motion; and a drive section that drives the plurality of light emitting areas according to the designated driving conditions, the driving condition designating section adjusts the driving conditions such that the driving conditions change smoothly in time.

The display apparatus according to the present invention includes a light modulating section that modulates illumination lights from the plurality of light emitting areas depending on an image signal to display an image.

Advantageous Effects of Invention

According to the present invention, when a driving duty and a driving current are controlled depending on motion, flicker caused by change of driving waveforms is prevented to make it possible to improve image quality.

BRIEF DESCRIPTION OF DRAWINGS

FIG. 3A is a diagram showing an example of change of driving waveforms to explain a generation principle of a flicker upon change of driving waveforms, and FIG. 3B is a diagram showing another example of the change of driving waveforms to explain another example of the change of driving waveforms;

FIG. 14A is a diagram showing another example of an ON/OFF signal waveform controlled by a scanning controller in the embodiment, and FIG. 14B is a diagram showing a duty of an ON/OFF signal shown in FIG. 14A;

FIG. 15A is a diagram showing a first example of a control result in the embodiment, FIG. 15B is a diagram showing a second example of the control result in the embodiment, FIG. 15C is a diagram showing a third example of a control result in the embodiment, FIG. 15D is a diagram showing a fourth example of the control result in the embodiment, FIG. 15E is a diagram showing a fifth example of a control result in the embodiment, and FIG. 15F is a diagram showing a sixth example of the control result in the embodiment.

DESCRIPTION OF EMBODIMENTS

Embodiments of the present invention will be described below in detail with reference to the accompanying drawings. In each of the embodiments, as a display apparatus, a liquid crystal display apparatus of an LED immediately-below type that directly radiates light of an LED from a backside of a liquid crystal panel will be described as a display apparatus.

(Embodiment 1)

Embodiment 1 of the present invention will be described below.

In the embodiment, a case in which a change in peak value and an updating cycle are suppressed in backlight scanning to prevent flicker upon change of driving waveforms will be described. The backlight scanning, as described above, is a technique that sequentially lights of scanning areas in synchronism with scanning of an image to reduce a residual image (moving image blurring).

<1-1 Configuration of Liquid Crystal Display Apparatus>

Figure 1:
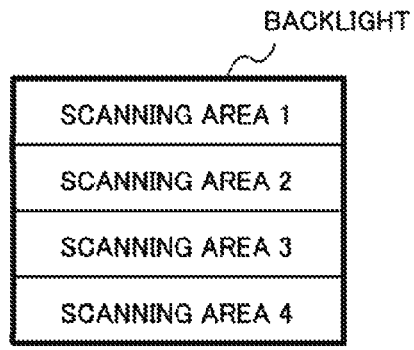
FIG. 1 is a diagram showing an example of a conventional scanning area.
Figure 2:
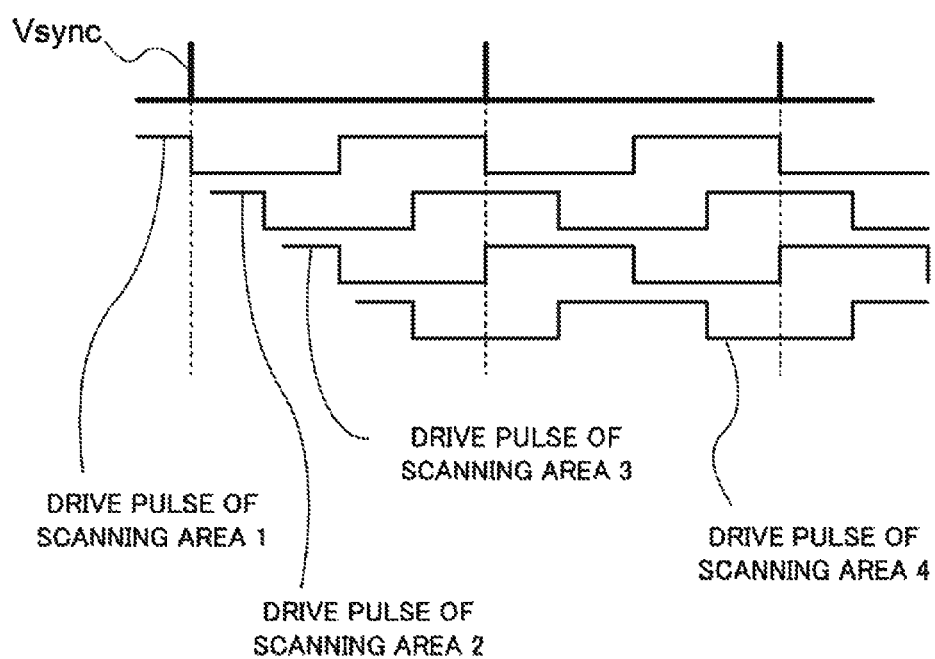
FIG. 2 is a diagram for explaining a conventional backlight scanning scheme.
Figure 4:
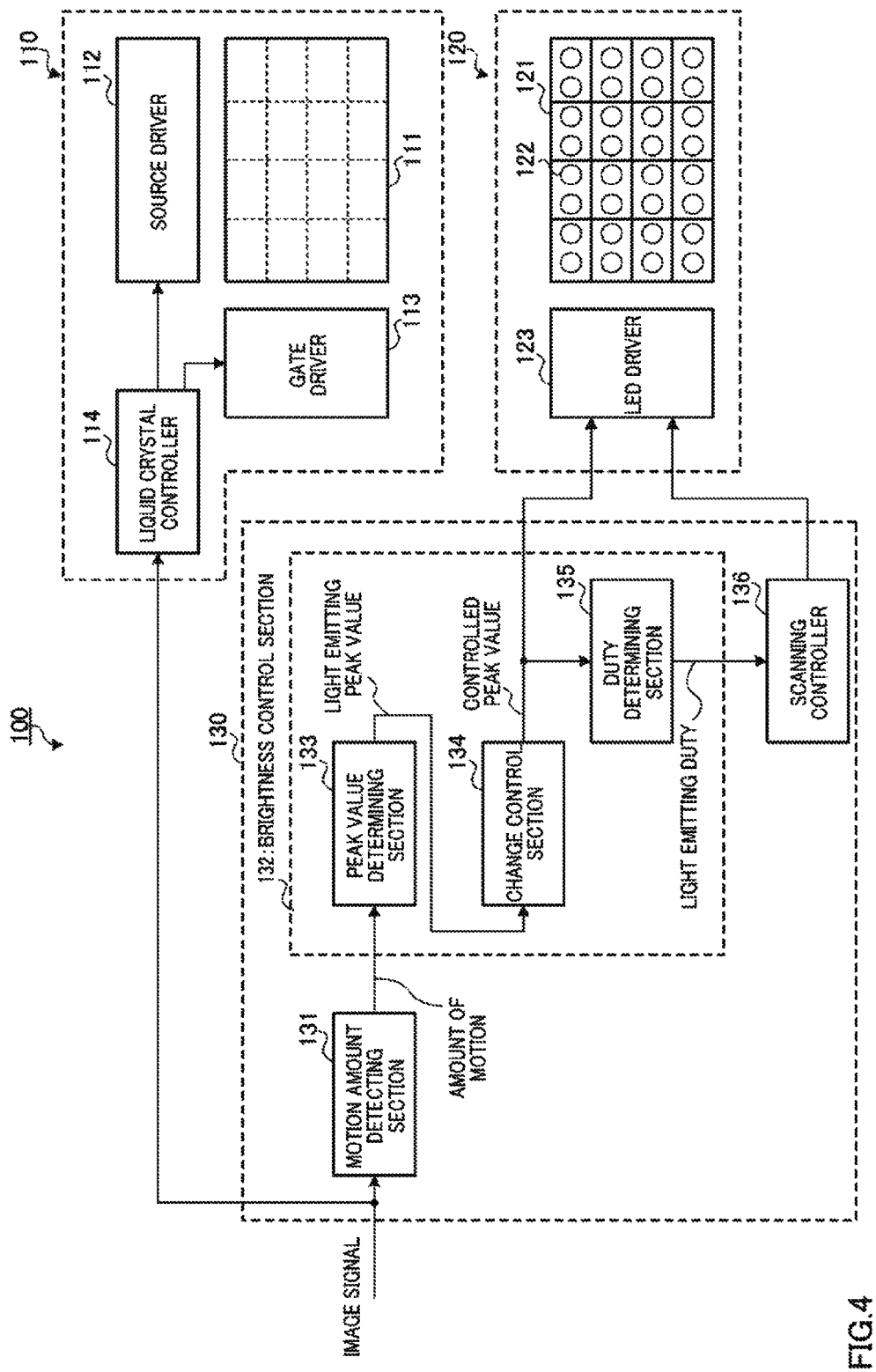
FIG. 4 is a block diagram showing a configuration of a liquid crystal display apparatus serving as a display apparatus according to Embodiment 1 of the present invention.

A configuration of a liquid crystal display apparatus will be described first. FIG. 4 is a block diagram showing a configuration of a liquid crystal display apparatus according to the embodiment. Liquid crystal display apparatus 100 shown in FIG. 4 has liquid crystal panel section 110, illuminating section 120, and drive control section 130. A configuration of illuminating section 120 and drive control section 130 configures a backlight apparatus.

Configurations of the sections will be described below in detail.

<1-1-1 Liquid Crystal Panel Section>

Liquid crystal panel 110 has liquid crystal panel 111, source driver 112, gate driver 113, and liquid crystal controller 114.

In liquid crystal panel 110, signal voltages are given from source driver 112 and gate driver 113 to pixels of liquid crystal panel 111 serving as a display section at a timing controlled by liquid crystal controller 114 to control a transmittance. Therefore, liquid crystal panel 111 can modulate an illumination light radiated from the backside of liquid crystal panel 111 depending on the image signals. In this manner, the image can be displayed in an image display area having a large number of pixels. To be more specific, liquid crystal panel 110 configures a light modulating section.

In this case, an image display area of liquid crystal panel 11 is partitioned by broken lines in FIG. 4. However, this clearly shows that liquid crystal panel 111 has a plurality of image display areas and does not mean that liquid crystal panel 111 is structurally divided or that the lines are displayed in the image. The same applies to other drawings.

Figure 5:
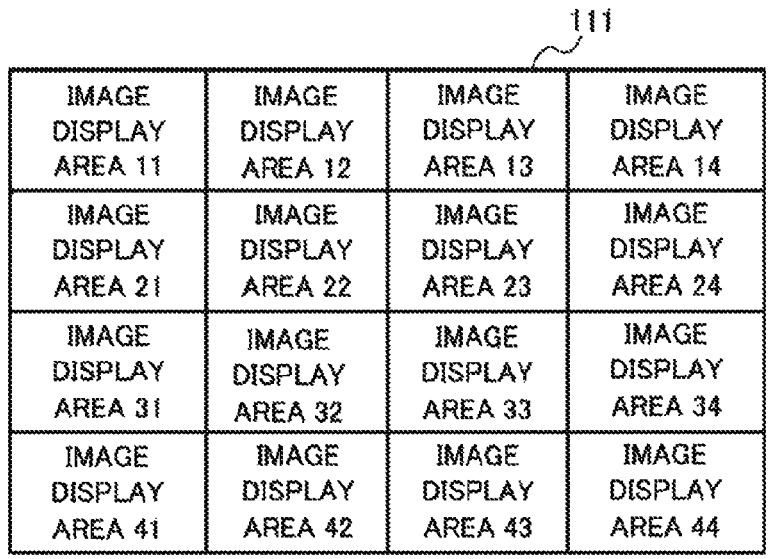
FIG. 5 is a diagram showing an image display area of a liquid crystal panel according to the embodiment.

In the embodiment, for example, as shown in FIG. 5, liquid crystal panel 111 will be explained such that liquid crystal panel 111 has, 16 (=4(4) image display areas 11 to 44 obtained by dividing an entire screen in the form of a matrix.

Although liquid crystal panel 111 is not specified, a panel using an IPS (In Plane Switching) scheme, a VA (Vertical Alignment) scheme, or the like can be used.

<1-1-2 Illuminating Section>

Illuminating section 120 emits an illumination light to display an image on liquid crystal panel 111 and radiates an the illumination light from the backside of liquid crystal panel 111 onto liquid crystal panel 111.

Illuminating section 120 has light emitting section 121. Light emitting section 121 employs a so-called direct-type configuration. Light emitting section 121 is arranged to face the backside of liquid crystal panel 111, and a large number of point-like light sources are arranged in the form of a plane along the backside of liquid crystal panel 111 so as to emit lights towards the LCP 111. Thereafter, light emitting section 121 emits the light generated from the light source and being incident on the backside from a front surface side.

In the embodiment, LEDs 122 are used as point-like light sources are used. All LEDs 122 emit white lights, and are configured to emit equal brightness when LEDs 122 are driven under the same driving conditions. Each of LEDs 122 may emit a white light by itself or may be configured to emit a white light by mixing RGB lights.

As the point-like light sources, light sources except for LEDs may be used, or light sources that emit lights except for white lights may be used.

In this case, in FIG. 4, a light emitting surface of light emitting section 121 is partitioned by a solid line. However, this clearly shows that light emitting section 121 has 4 (4=16) light emitting areas (see FIG. 6) and does not mean that light emitting section 121 is structurally divided. The same applies to other drawings.

Figure 6:
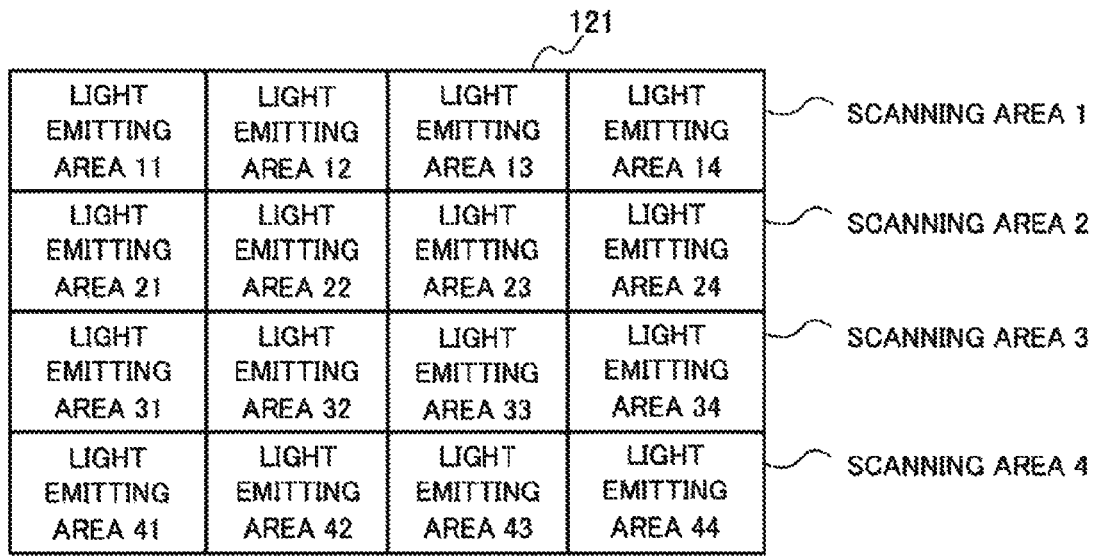
FIG. 6 is a diagram showing a light emitting area and a scanning area of a display section according to the embodiment.

To be more specific, in the embodiment, as shown in FIG. 6, light emitting section 121 has 16 (=4(4) light emitting areas 11 to 44 obtained by dividing an entire light emitting surface in the form of a matrix. In this case, light emitting areas 11 to 14 are included in scanning area 1, light emitting areas 21 to 24 are included in scanning area 2, light emitting areas 31 to 34 are included in scanning area 3, and light emitting areas 41 to 44 are included in scanning area 4.

Illuminating section 120 has LED driver 123 serving as a drive section that drives LED 122. LED driver 123 is arranged for each light emitting area. To be more specific, the light emitting area is a minimum driving control unit.

Figure 7:
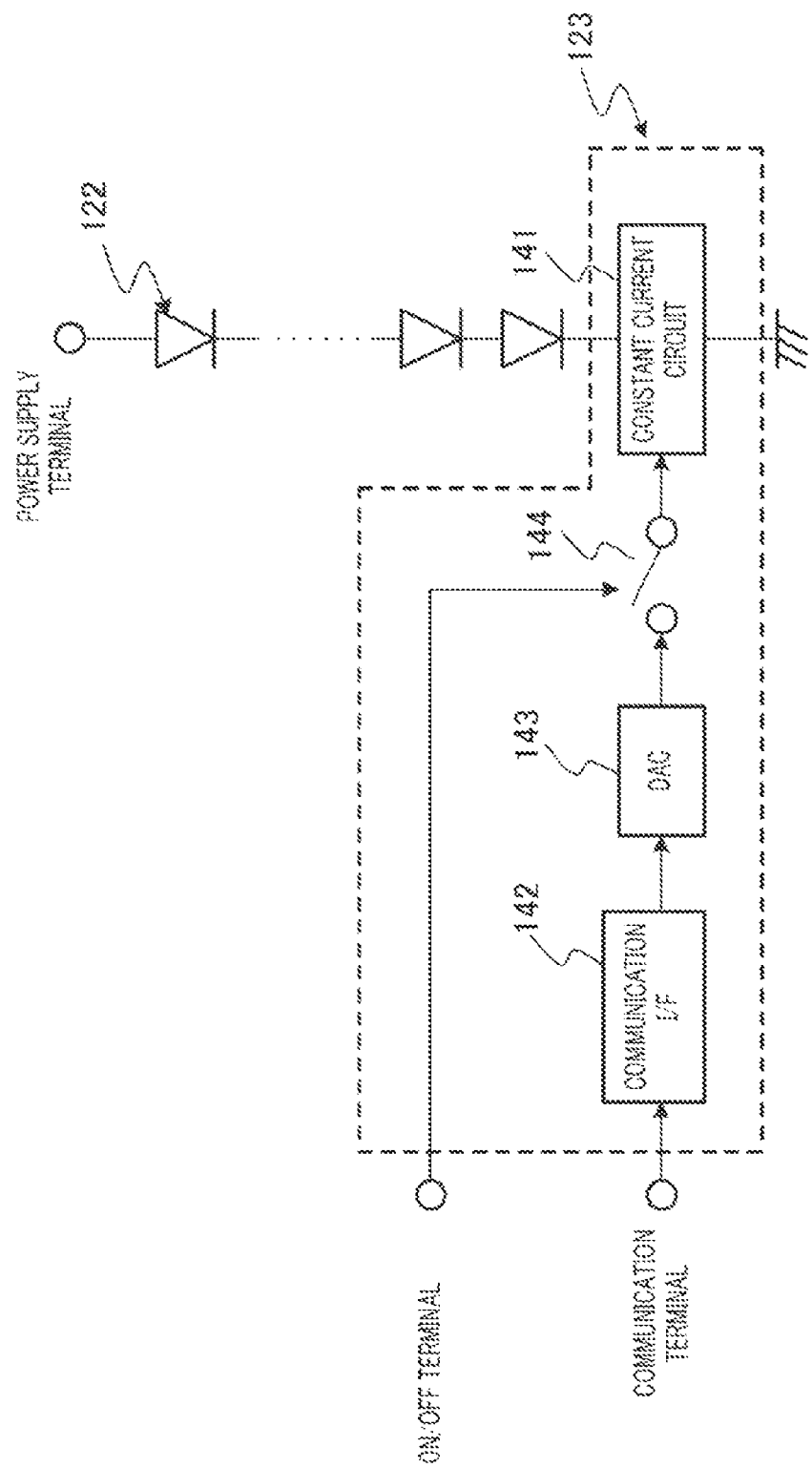
FIG. 7 is a block diagram showing a configuration of an LED driver according to the embodiment.

FIG. 7 shows an example of the configuration of LED driver 123. LED driver 123 has constant current circuit 141 that supplies a current to a plurality of LEDs 122 connected in series with each other, communication interface (I/F) 142 that receives current value data representing a peak value of which constant current circuit 141 is notified from drive control section 130 via a communication terminal, digital to analog converter (DAC) 143 that converts the current value data into a current command signal serving as an analog signal, and switch 144 that makes it possible to input the current command signal from DAC 143 to constant current circuit 141 or blocks the current command signal. To be more specific, LED driver 123 is configured such that a current being in proportion to a signal voltage of the current command signal is supplied from constant current circuit 141 to LED 122 when switch 144 is in an ON state and the current supply is cut when the switch 144 is in an OFF state. In the embodiment, the configuration is equipped for each light emitting area.

With the above configuration, LED driver 123 independently drives a plurality of light emitting areas according to driving conditions including a duty (ON duty) and a peak value of a driving pulse designated per light emitting area to make it possible to emit light. In this manner, each light emitting area mainly radiates light on an image display area facing the light emitting area in a state in which the light emitting area is arranged to face the image display area corresponding to liquid crystal panel 111. It is mentioned here that the light emitting area "mainly radiates light" because an illumination light is also radiated on an image display area that does not face the light emitting area.

<1-1-3. Driving Control Section>

Drive control section 130 is an arithmetic processing apparatus having motion amount detecting section 131, brightness control section 132, and brightness command value determining section 136, and controls driving conditions including the duty and peak value of a driving pulse for each light emitting area based on an input image signal of each of the image display areas. Brightness control section 132 has peak value determining section 133, change control section 134, and duty determining section 135. In drive control section 130, a combination of brightness control section 132 (peak value determining section 133, change control section 134, and duty determining section 135) and scanning controller 136 configures a driving condition designating section that designates driving conditions based on the amount of motion.

<1-1-3-1. Motion Amount Detecting Section>

Motion amount detecting section 131 detects the amount of motion of an image based on an input image signal. The amount of motion is not calculated as two values such as 50% and 100% but is calculated as many values such as 3 or more values to optimize an apparent moving image resolution and an electric power.

Figure 8:
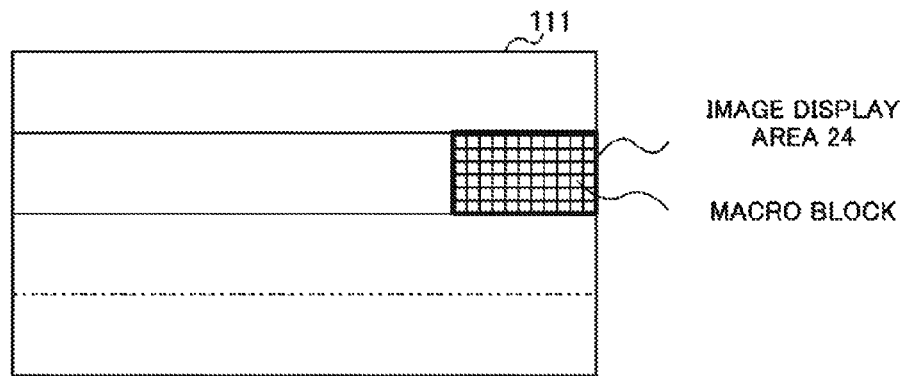
FIG. 8 is a diagram showing macro blocks segmented from an image display area according to the embodiment.

As a method of detecting the amount of motion, a method of calculating an amount of motion by pattern matching a current frame with a previous frame with respect to all macro blocks in units of macro blocks is known. In this case, the macro block is each area defined by segmenting an image display area. FIG. 8 shows a macro block in image display area 24 of liquid crystal panel 111. As a simpler amount of motion detecting method, a method using a magnitude of a difference between image signals of a current frame and a previous frame at the same pixel position in place of a result of pattern matching or the like is known.

In the embodiment, motion amount detecting section 131 employs a configuration in which a maximum value of an amount of motion of each macro block calculated by the method that is the former is output as a detection value. To be more specific, when the maximum values of the moving areas when an image moves in an entire image display area and when an image moves in only a part of the image display area are equal to each other, the same values are output.

Figure 9:
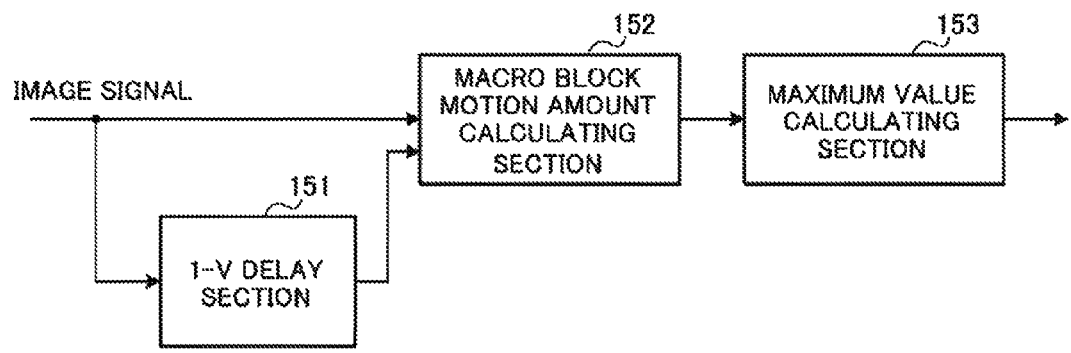
FIG. 9 is a block diagram showing a configuration of a motion amount detecting section in the embodiment.

FIG. 9 shows a configuration of motion amount detecting section 131. Motion amount detecting section 131 has 1 V delay section 151 that delays an input image signal by 1 frame, a macro block motion amount calculating section 152 that calculates the amount of motion of an image for each macro block, and maximum value calculating section 153 that calculates a maximum value in the calculated amount of motions. This configuration is equipped for each of the moving areas.

With the configuration, motion amount detecting section 131 detects the amount of motion of an image for each image display area.

<1-1-3-2. Brightness Control Section>

Brightness control section 132 determines a light emitting peak value and a light emitting duty of each light emitting area based on the amount of motion detected by motion amount detecting section 131. In the embodiment, in order to prevent a change in brightness caused by a difference (in general, an adjusting resolution is lower than an adjusting resolution of a duty) between adjusting resolutions of a peak value and a duty of a driving pulse in LED driver 123, after the light emitting peak value having a low adjusting resolution is determined first, a the duty having a high adjusting resolution is determined. To be more specific, after the light emitting peak value is determined based on the amount of motion, the light emitting duty is determined based on the obtained peak value. In this case, in the embodiment, in order to suppress flicker upon change of driving waveforms, a change in peak value and an updating cycle that are to be determined first are suppressed. Brightness control section 132 has peak value determining section 133, change control section 134, and duty determining section 135.

Peak value determining section 133 determines a light emitting peak value for each light emitting area based on the amount of motion detected by motion amount detecting section 131. To be more specific, for example, peak value determining section 133 applies a predetermined transformation formula to the amount of motion detected for each of the image display areas to calculate a light emitting peak value for each light emitting area, and the light emitting peak value is determined as a light emitting peak value designated per light emitting area.

Change control section 134 suppresses the change in peak value that is determined by peak value determining section 133 and the updating cycle according to corresponding predetermined limiting rules, respectively, to prevent flicker upon change of driving waveforms. The limiting rules are set with respect to the change in peak value and the updating cycle in advance based on, for example, an experiment result.

Figure 10:
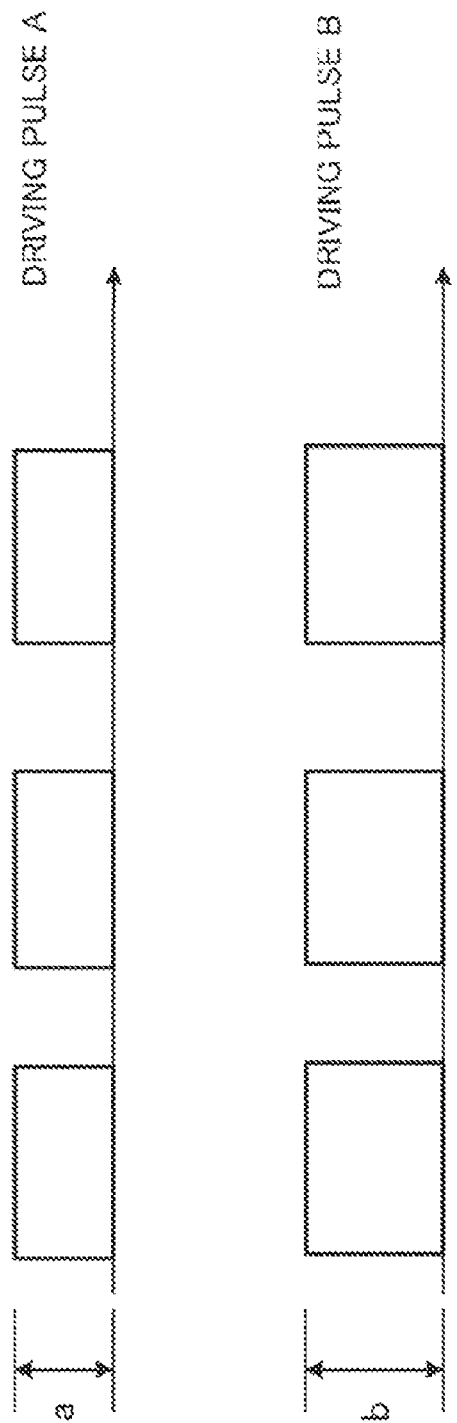
FIG. 10 is a diagram for explaining a limiting rule of a change in peak value in the embodiment.

It is assumed that a command of changing peak value a to peak value a to peak value b by changing an output from motion amount detecting section 131 is received. These states are shown in FIG. 10. The states are driving pulses A and B each having the same duty (duty obtained in previous updating) and having peak value a and peak value b, respectively. At this time, a change in peak value in every updating is suppressed such that an average brightness of driving pulse A has a change (|(((|/((100(2) in peak value (=|a−b|) that is a change within a predetermined value (for example, 2%, desirably, 1%) with respect to an average brightness of driving pulse B. In duty determining section 135 to be described later, the difference between the average brightnesses is cancelled. However, the difference appears as a flicker. Therefore, a change in peak value in which a flicker is allowed varies depending on duties at different times. To be more specific, a allowed change in peak value iDUTY (the unit of which is, for example, [mA]) is calculated each time the duty changes. When a command that causes a change in peak value exceeding the allowed peak value is received, the excess may be cut. In practice, since a change in average brightness with respect to a peak value is large when a duty is large, when all the changes in peak value' are regulated by an allowed change in peak value i100 obtained when the duty is maximum (i.e. 100%), the change in peak value can be controlled. To be more specific, when the change in peak value is i100 or less, the change in peak value is not limited. However, when the change in peak value exceeds i100, the excess is cut. In this manner, change control section 134 outputs the peak value the change of which is controlled (i.e. corrected) as a controlled peak value. The controlled peak value is output to LED driver 123 of illuminating section 120 and duty determining section 135. In this manner, the peak value is finally designated as a driving condition to each light emitting area.

Change control section 134 limits an updating cycle according a predetermined limiting rule. For example, change control section 134 suppresses the updating cycle to a half (about 15 msec) of an integral cycle (residual image time) of human eyes and does not make the updating cycle smaller than the half of the integral cycle. To be more specific, change control section 134 sets the updating cycle to a predetermined value (for example, 15 msec) or more. To be more specific, when a driving pulse is updated in accordance with a V cycle (vertical cycle) of an image signal having a frequency of 48 Hz, 50 Hz, or 60 Hz, these cycles are 16.6 msec at the shortest frequency of 60 Hz. For this reason, the above limiting rule is originally satisfied. In contrast to this, for example, when an amount of motion is detected for each image having a V cycle of 120 Hz to change driving pulses, since the cycle at 120 Hz is 8.3 msec, the limiting rule is not satisfied without changing the conditions. Therefore, in this case, for example, an updating cycle of a driving pulse is suppressed to an updating cycle that is every 2 Vs. As a result, the same updating cycle as that obtained at 60 Hz is set. Similarly, when the V cycle is 240 Hz, updating is performed in a cycle given as every 4 Vs. To be more specific, change control section 134 sets an output updating interval the V cycle of the image signal or an integral multiple of the V cycle to suppress the updating cycle within the predetermined limit. In this manner, change control section 134 determines the unit of the updating cycle as a V unit (when V is a constant speed) to make it possible to set the number of Vs every which updating is performed.

In place of the setting in which the updating cycle is an integral multiple of the V cycle, the change in peak value is limited to one integerth of an original allowable change in peak value to make it possible to prevent flicker upon change of driving waveforms. For example, when updating is performed every 120 Hz or 240 Hz, the updating cycle is not limited every 2 Vs or every 4 Vs, the change in peak value is limited to ½ or ¼ the original allowable change to make it possible to obtain the same effect. However, in this case, the nonlinearlity of brightness with respect to a peak value of a light source is neglected. However, the allowable change iDUTY or i100 is generally a narrow peak value range, and the range of variation of brightness corresponding to the peak value range is also narrow. Therefore, since it can be regarded that a relationship between the peak value and the brightness is almost linear in the above range, the above theory is satisfied. On the other hand, an allowable change in peak value calculated by limiting 2% (desirably, 1%) that is an allowable brightness change range serving as a conventional reference to ½ or ¼ is an accurate value.

Figure 11:
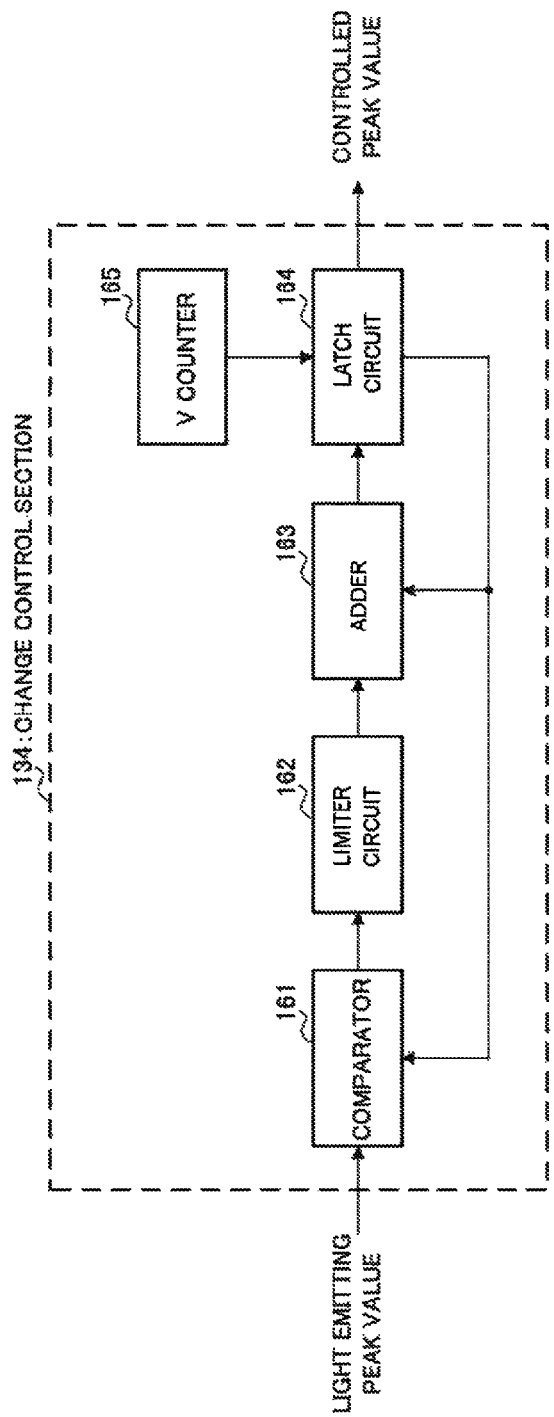
FIG. 11 is a block diagram showing an example of a configuration of a change control section in the embodiment.

FIG. 11 is a block diagram showing an example of a configuration of change control section 134. In the example, change control section 134 uses a change limiter as a means that limits a change in peak value. To be more specific, change control section 134 has comparator 161 that detects a difference between a current peak value and a previous peak value (i.e. a peak value obtained in previous updating), limiter circuit 162 that limiting the detected difference to a predetermined value (i100) or less, adder 163 that adds or subtracts the difference limited to the predetermined value or less and the previous peak value to generate a controlled peak value, latch circuit 164 that temporarily holds the generated controlled peak value to cause the controlled peak value to pass in a predetermined updating cycle, and V counter 165 that sets an updating cycle to designate the number of Vs every which updating is performed. Limiter 162 configures a change limiter, and a combination of V counter 165 and latch circuit 164 configures an output updating interval setting section. With respect to an allowable change, a limiter upper limit iDUTY may be calculated every updating based on a duty obtained in previous updating.

Figure 12:
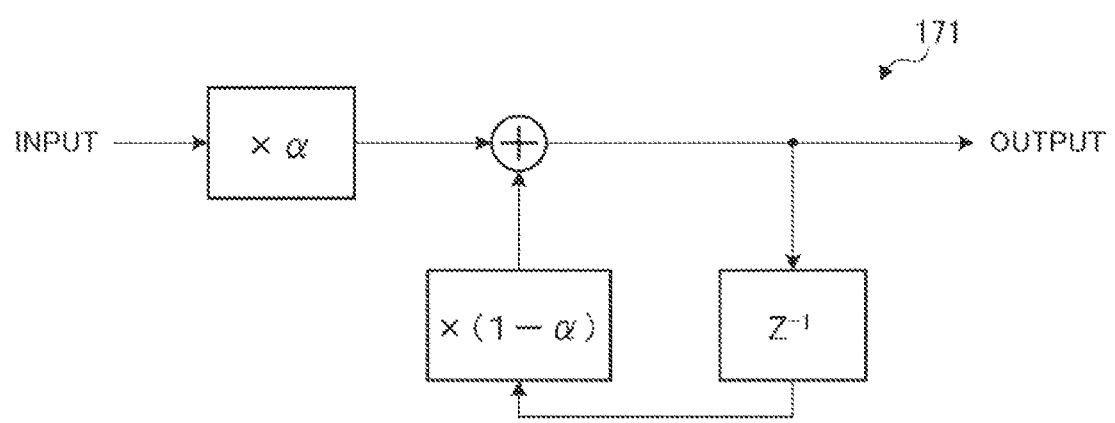
FIG. 12 is a block diagram showing another example of a configuration of a change control section in the embodiment.

FIG. 12 is a block diagram showing another example of a configuration of change control section 134. In the example, change control section 134 uses filter 171 in a direction of time as a means that limits a change in peak value. Filter 171 filters an input (light emitting peak value) in a direction of a time axis (output is a controlled peak value). As filter 171, as shown in FIG. 12, a general infinite impulse response (1IR) filter circuit can be used. In FIG. 12, for ease of explanation, latch circuit 164 and V counter 165 shown in FIG. 11 are omitted.

Duty determining section 135 determines a light emitting duty of each light emitting area based on the controlled peak value the change of which is limited by change control section 134. To be more specific, for example, duty determining section 135 applies a predetermined transformation formula to the controlled peak value determined for each light emitting area to calculate a light emitting duty to each light emitting area, and the light emitting duty is determined as a light emitting duty designated per light emitting area. The predetermined transformation formula, for example, is an ideal brightness retention curve calculated by measurement. Duty determining section 135 calculates a light emitting duty at which a brightness can be kept at a constant level based on the controlled peak value determined for each light emitting area.

In this case, brightness control section 132 controls the light emitting duty to increase the light emitting duty when the amount of motion is small and controls the light emitting duty to decrease the light emitting duty when the amount of motion is large, and controls the controlled peak value and the light emitting duty to keep a light emitting brightness serving as a result of the controlled peak value and the light emitting duty at a predetermined value.

When motion suddenly change, the amount of motion may vary for a short period of time. When scenes of an input image change or when there are a plurality of scenes, a motion detection error may occur in motion amount detecting section 131. For this reason, the amount of motion may vary significantly. In this case, the driving conditions such as the duty and peak value of a driving pulse vary significantly within a short period of time depending on the amount of motion. In duty determining section 135, a duty is calculated such that a constant brightness can be obtained even though a peak value changes. However, as described above, when driving waveforms having the same brightness are used, the same brightness may not be able to be accurately maintained in a period of transition of driving waveforms. Since human eyes have high sensitivity to a change in brightness, even an instantaneous slight change in brightness is recognized as a flicker.

According to the embodiment, since change control section 134 is arranged to suppress change of peak value and updating cycle, flicker generated upon change of driving waveforms can be prevented.

In the embodiment exemplifies a case in which, after the peak value is determined first, a duty is determined. However, the invention is not limited to the example. The present invention is also applicable to a case in which, after a duty is determined first, a peak value is determined. In this case, in order to suppress flicker upon change of driving waveforms, in addition to the updating cycle, a change of duty to be determined first is suppressed. Also in the case in which the change of duty is limited, the limiting rules for the change of duty may be set based on an experiment result in advance. To be more specific, the duty may be limited such that the duty does not change by 2% or more with reference to a duty obtained 1 V ago.

<1-1-3-3. Scanning Controller>

Scanning controller 136 generates an ON/OFF signal for each light emitting area at a timing (the updating cycle set as described above) set with reference to a vertical sync signal according to a driving duty (light emitting duty) determined for each light emitting area and outputs the generated ON/OFF signal to LED driver 123 of illuminating section 120. In this manner, the driving duty is designated per light emitting area as a driving condition. In this manner, LED driver 123, when an ON/OFF signal of a certain light emitting area is ON, drives the light emitting area to cause the light emitting area to emit light, and, when the ON/OFF signal is OFF, does not drive the light emitting area to generate a driving pulse without causing the light emitting area to emit light. As a result, the driving pulse is supplied to LED 122 included in the light emitting area.

Scanning controller 136 also performs pulse driving to have up to one pulse for one frame cycle of writing of liquid crystal panel 111. In this manner, a residual image reducing, effect by narrowing a duty can be maximized. Furthermore, scanning controller 136 performs backlight scanning in which the timing of the driving pulse is synchronized with the timing at which pixels of liquid crystal panel 111 are updated and scanned.

Figures 13A, 13B:
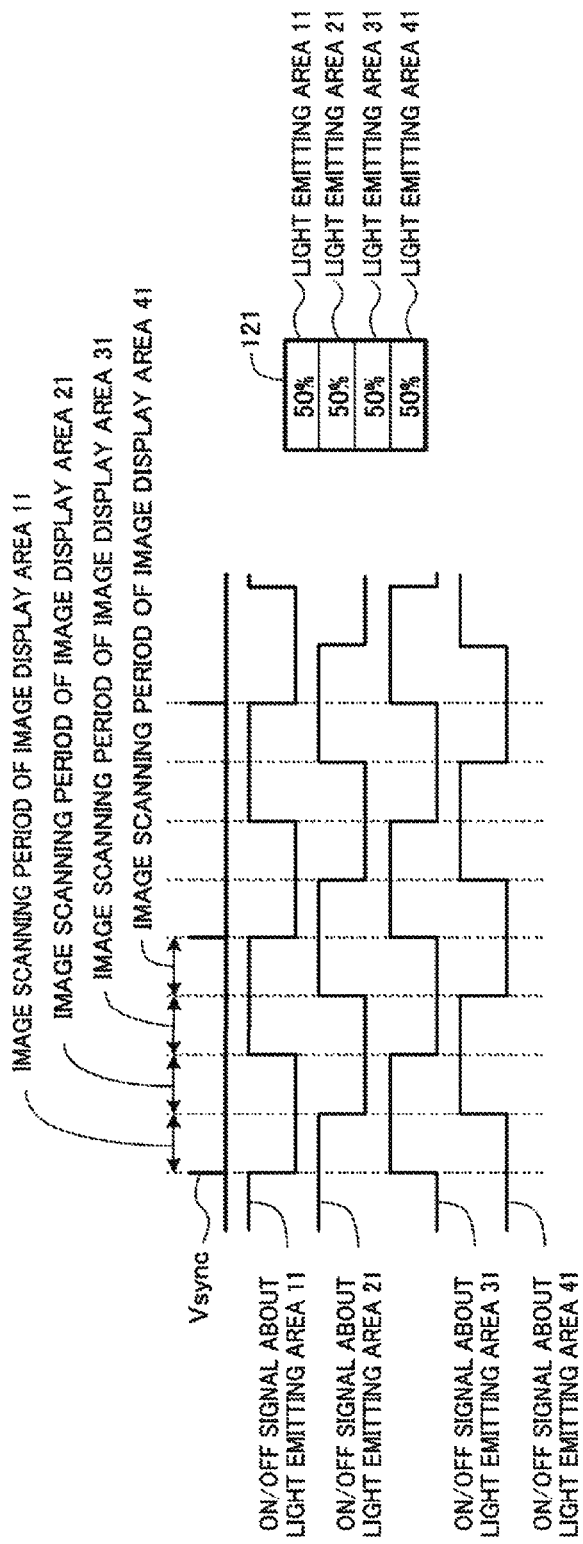
FIG. 13A is a diagram showing an example of an ON/OFF signal waveform controlled by a scanning controller in the embodiment.
FIG. 13B is a diagram showing a duty of the ON/OFF signal shown in FIG. 13A.

FIG. 13A shows an example of an ON/OFF signal waveform output from scanning controller 136. In this case, an ON/OFF signal that is output when all driving duties determined with respect to four light emitting areas 11, 21, 31, and 41 as shown in FIG. 13B are equal to each other (i.e. 50% is shown). Since image scanning is performed to image display area 11, image display area 21, image display area 31, and image display area 41 in the order named, backlight scanning is also performed to light emitting area 11, light emitting area 21, light emitting area 31, and light emitting area 41 in the order named.

In the example shown in FIG. 13A, in an image scanning period of light emitting areas 11, 21, 31, and 41, timings at corresponding light emitting areas 11, 21, 31, and 41 are turned off are controlled. For this reason, a moving image resolution can be improved.

FIG. 14A shows another example of an ON/OFF signal waveform output from scanning controller 136. In this case, ON/OFF signals output when driving duties determined with respect to four light emitting areas 11, 21, 31, and 41 as shown in FIG. 14B are different from each other is shown. As shown in FIG. 14A, when the driving duties of light emitting areas 11, 21, 31, and 41 are changed, rising phases are changed without changing falling phases in the ON/OFF signals of light emitting areas 11, 21, 31, and 41.

The configuration of liquid crystal display apparatus 100 has been described above.

<1-2. Operation of Liquid Crystal Display Apparatus>

An operation (overall operation) executed by entire liquid crystal display apparatus 100 having the above configuration will be described below with a central focus on characteristic operations of the present invention.

<1-2-1. Overall Operation>

Motion amount detecting section 131 detects the amount of motion of an image based on an input image signal. The detected amount of motion is output to brightness control section 132.

Brightness control section 132 determines controlled peak values and light emitting duties of the light emitting areas based on the amount of motion detected by motion amount detecting section 131. In this case, in the embodiment, in order to prevent image quality from being deteriorated due to a low resolution of peak value adjustment, after a light emitting peak value having a low adjusting resolution is determined, a light emitting duty having a high adjusting resolution is determined. Furthermore, in order to prevent flicker upon change of driving waveforms, when driving conditions are changed, the driving conditions are adjusted such that the driving conditions change smoothly in time. In this case, in the embodiment, in order to suppress flicker upon change of driving waveforms, a change in peak value that is to be determined first and an updating cycle are suppressed.

To be more specific, peak value determining section 133 applies a predetermined transformation formula to the amount of motion detected by motion amount detecting section 131 to determine a light emitting peak value for each light emitting area. Change control section 134 suppresses the change in peak value determined by peak value determining section 133 and the updating cycle according to corresponding predetermined limiting rules, respectively. Thereafter, duty determining section 135 applies a predetermined transformation formula to a controlled peak value obtained for each light emitting area every updating to determine a light emitting duty for each light emitting area. In this case, the light emitting duty is controlled to increase the light emitting duty when the amount of motion is small, and the light emitting duty is controlled to decrease the light emitting duty when the amount of motion is large, and the controlled peak value and the light emitting duty are controlled to keep a light emitting brightness serving as a result of the controlled peak value and the light emitting duty at a predetermined value. The controlled peak value obtained by change control section 134 is output to LED driver 123 of illuminating section 120, and the light emitting duty determined by duty determining section 135 is output to scanning controller 136.

Scanning controller 136 generates an ON/OFF signal for each light emitting area at a timing (the updating cycle set as described above) set with reference to a vertical sync signal according to a light emitting duty determined by duty determining section 135 for each light emitting area. The generated ON/OFF signal is output to LED driver 123 of illuminating section 120.

<1-2-2. Effect>

With the above operation, for example, driving waveforms are controlled as shown in FIG. 15A to 15F to make it possible to prevent flicker upon change of driving waveforms (however, except for the cases shown in FIGS. 15B and 15D).

To be more specific, for example, in the case shown in FIG. 15A, the maximum change C in peak value is a predetermined value (iDUTY) or less, and the updating cycle is sufficiently large. For this reason, flicker is not generated upon change of driving waveforms. In contrast to this, as shown in FIG. 15B, even though the updating cycle is sufficiently large, when the maximum change D in peak value exceeds the predetermined value (iDUTY), flicker is generated upon change of driving waveforms.

In the case shown in FIG. 15C, maximum change in peak value C is a predetermined value (iDUTY) or less, and the updating cycle (15 msec) is a predetermined value (15 msec) or more. For this reason, flicker is not generated upon change of driving waveforms. In contrast to this, as shown in FIG. 15D, even though maximum change in peak value D is a predetermined value (iDUTY) or less, when the updating cycle (7.5 msec) is shorter than the predetermined value (15 msec), flicker is generated upon change of driving waveforms.

However, in the case shown in FIG. 15D, for example, the updating cycle is doubled as shown in FIG. 15E, or, as shown in FIG. 15F, the maximum change in peak value is ½ the original allowable change C to make it possible to prevent flicker upon change of driving waveforms.

In this manner, according to the embodiment, since change control section 134 is arranged to suppress change of peak value and updating cycle, flicker generated upon change of driving waveforms can be prevented. Therefore, when a driving duty and a driving current are controlled depending on motion, flicker caused by change of driving waveforms is prevented to make it possible to improve image quality.

In the embodiment, the case in which a plurality of different driving duties and a plurality of different driving currents are controlled in a horizontal direction in the same scanning area. However, the present invention is not limited to the configuration. For example, the present invention is also applicable to the case in which light emitting areas are not divided in the horizontal direction (i.e. amount of motion detection is not performed in image display areas divided in the horizontal direction). Furthermore, the scanning area may be separated from a vertical dividing unit for detecting the amount of motion as a lighting phase control unit. In this case, the image display area and an area boundary of backlight scanning are overlapped, and an LED needs to be driven and controlled in new area units surrounded by the boundary. To be more specific, the overlapped boundary is a virtual boundary of new light emitting areas. This is also applied to the subsequent embodiments.

(Embodiment 2)

Embodiment 2 of the present invention will be described below. A liquid crystal display apparatus according to the embodiment has the same basic configuration as that of the liquid crystal display apparatus according to the embodiment described above. Therefore, the same reference numerals as in the above embodiment denote the same or corresponding constituent elements in Embodiment 2, and a description thereof will be omitted. Different points between Embodiment 2 and the embodiment described above will be mainly described below.

In the embodiment, a case in which a change in peak value and an updating cycle are suppressed in a combination of backlight scanning and local dimming to prevent flicker upon change of driving waveforms will be described. In this case, the local dimming is a technique that controls a brightness for each light emitting area in accordance with an image to improve a contrast.

<2-1. Configuration of Liquid Crystal Display Apparatus>

Figure 16:
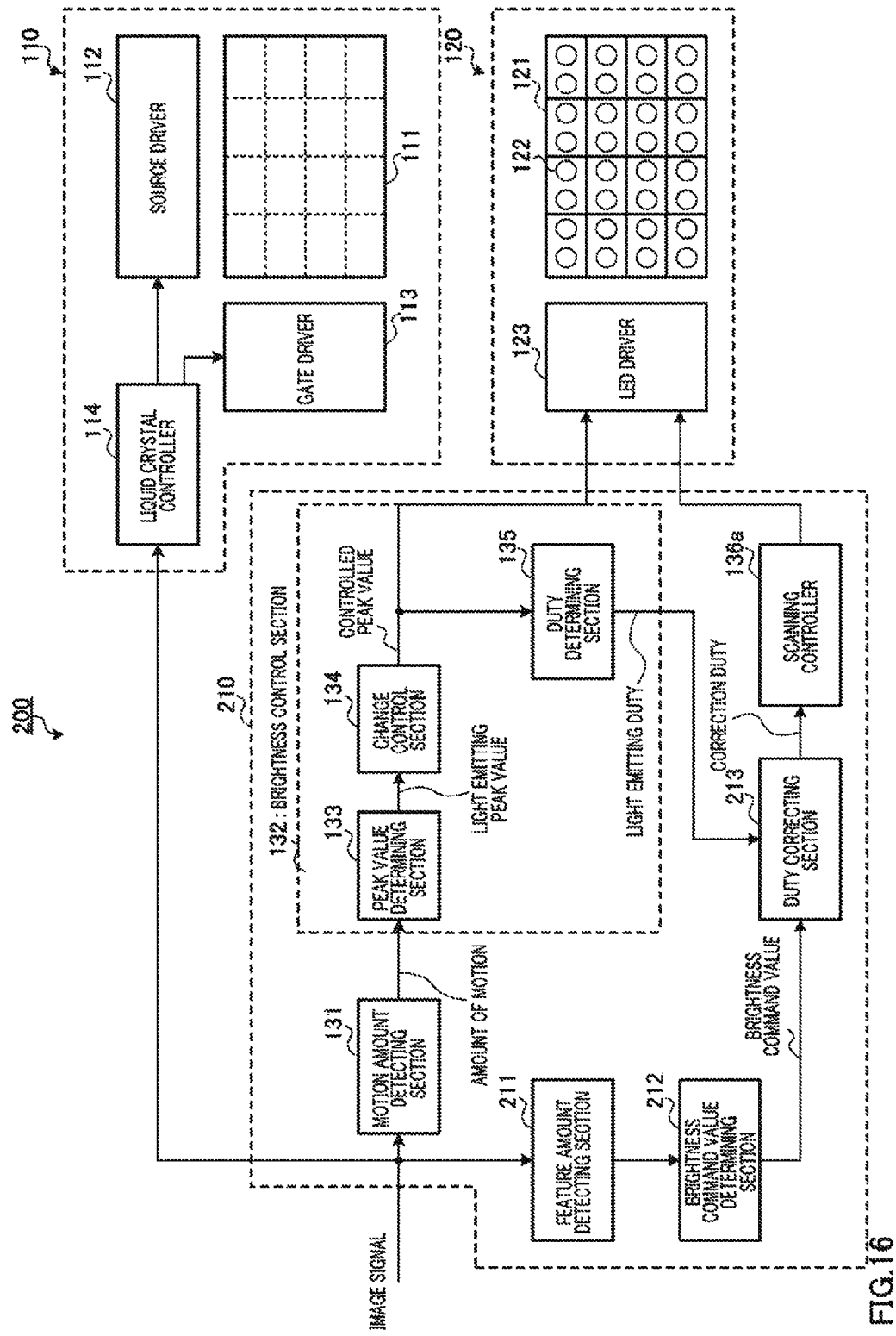
FIG. 16 is a block diagram showing a configuration of a liquid crystal display apparatus serving as a display apparatus according to Embodiment 2 of the present invention.

FIG. 16 is a block diagram showing a configuration of a liquid crystal display apparatus according to the embodiment. Liquid crystal display apparatus 200 shown in FIG. 16 has drive control section 210 in place of drive control section 130. Drive control section 210 is an arithmetic processing apparatus having motion amount detecting section 131, brightness control section 132, feature amount detecting section 211, brightness command value determining section 212, duty correcting section 213, and scanning control section 136a, and controls driving conditions including the duty and peak value of a driving pulse for each light emitting area based on an input image signal of each of the image display areas. Brightness control section 132 has peak value determining section 133, change control section 134, and duty determining section 135. In drive control section 210, a combination of brightness control section 132 (peak value determining section 133, change control section 134, and duty determining section 135), duty correcting section 213, and scanning controller 136a configures a driving condition designating section that designates driving conditions based on the amount of motion.

The scanning area is a control unit of backlight scanning, and the light emitting area is a drive control unit of an LED. In the embodiment, a case in which the scanning area corresponds to a plurality of image display areas, respectively.

<2-1-1. Feature Amount Detecting Section>

Feature amount detecting section 211 detects a feature amount of an input image signal. To be more specific, feature amount detecting section 211 mainly detects a feature amount of the input image signal for each image display area of liquid crystal panel 111. In this case, the "feature amount" is a feature amount related to the brightness of an image signal of each of the image display areas on liquid crystal panel 111. As the feature amount, for example, a maximum brightness level and a minimum brightness level of the image signal of each of the image display areas on liquid crystal panel 111, the difference between the maximum brightness level and the minimum brightness level, an average brightness level, and the like can be used. The "mainly" is added in the above description because final feature amounts of the image display areas may be determined in consideration of the feature amounts of all the image signals and the feature amounts of an image display area arranged around an image display area to be calculated.

<2-1-2. Brightness Command Value Determining Section>

Brightness command value determining section 212 determines a brightness command value of each light emitting area based on the amount of feature detected by feature amount detecting section 211. To be more specific, for example, brightness command value determining section 212 calculates a brightness value (brightness command value) at which each light emitting area should emit light from the detected feature amount by using a transformation table, a transformation function, and the like having predetermined characteristics. The brightness command value is set with reference to a brightness command value obtained when the light emitting duty is 100%.

<2-1-3. Duty Correcting Section>

Duty correcting section 213 corrects the brightness command value determined by brightness command value determining section 212 based on a light emitting duty determined by duty determining section 135. To be more specific, for example, duty correcting section 213 is configured by a multiplier. The brightness command value determined by brightness command value determining section 212 is multiplied (superposed) by the light emitting duty determined by the duty determining section 135 to determine a correction duty serving as a final light emitting duty. To be more specific, duty correcting section 213 normalizes (corrects) a brightness command value obtained by local dimming by using the light emitting duty obtained based on a detected amount of motion and outputs the result as a correction duty.

In the above explanation, a dividing operation generally performed in normalization is not described. It is assumed that duty correcting section 213 is a digital input/output. For example, in the specification, the brightness command value duty and the light emitting duty are input in 8 bits each and output to scanning control section 136a in 16 hits. In this case, since a multiplication result of duties each having 8 bits has 16 hits, a dividing operation is not performed. When the multiplication result is rounded to have 8 bits and then multiplied by, the eighth power of 2 to obtain a 16-bit result, a rounding error is generated in vain. Such an operation is not performed here. When the output has X bits, only high X bits are wired and output based on a multiplication result between the brightness command value and the light emitting duty. In this manner, when an input/output of duty correcting section 213 is digital data, a functional block serving as a divider need not be specially arranged. A dividing operation that cuts off lower bits depending on the number of output bits is merely interposed. Therefore, in the above description, it is assumed that duty correcting section 213 is configured by a multiplier.

<2-1-4. Scanning Controller>

Scanning controller 136a generates an ON/OFF signal for each light emitting area at a timing (the updating cycle set as described above) set with reference to a vertical sync signal according to a correction duty determined for each light emitting area and outputs the generated ON/OFF signal to LED, driver 123 of illuminating section 120.

In this manner, according to the embodiment, as in Embodiment 1, since change control section 134 is arranged to suppress change of peak value and updating cycle, flicker generated upon change of driving waveforms can be prevented.

Therefore, in the configuration obtained by combining backlight scanning and local dimming, even though a driving duty and a driving current are controlled depending on motion, flicker generated by change of driving waveforms is prevented to make it possible to improve image quality.

In the embodiment, reference image display areas in detection of an amount of motion and detection of a feature amount for local dimming are similar divided units. However, the areas may be different from each other. In this case, it is assumed that the former is called a moving area and the latter is called a brightness area for ease of explanation. In this manner, the image display area is defined as an area surrounded by a boundary obtained by overlapping a virtual boundary of moving areas and a virtual boundary of brightness areas. In Embodiment 1, the image display area and the moving area are equal to each other. In Embodiment 2, an image display area, a moving area, and a brightness area are equal to each other. A light emitting area serving as an LED driving control unit is an area surrounded by a boundary obtained when a boundary of the image display areas and a boundary of the scanning areas are overlapped.

Embodiments of the present invention have been described above. The above explanation is an exemplification of a preferred embodiment of the present invention, and the spirit and scope of the present invention are not limited to the embodiments. To be more specific, the configurations and the operations of the apparatus described in each of the embodiments are only illustrations. The configurations and the operations can be partially changed, added, and deleted without departing from the spirit and scope of the invention as a matter of course.

For example, each embodiment above exemplifies a case where the present invention is applied to a liquid crystal display apparatus. However, even though a light modulating section has a display section different from a liquid crystal panel, another non-self-luminous configuration can be employed. To be more specific, the present invention is also applicable to a non-self-luminous display apparatus except for a liquid crystal display apparatus.

The disclosure of Japanese Patent Application No. 2009-230734, filed on Oct. 2, 2009, including the specification, drawings and abstract; is incorporated herein by reference in its entirety.

INDUSTRIAL APPLICABILITY

A backlight apparatus and a display apparatus according to the present invention, when a driving duty and a driving current are controlled depending on motion, advantageously prevent flicker caused by change of driving waveforms to make it possible to improve image quality, and are useful as a backlight apparatus and a display apparatus using a scheme that controls a driving duty and a driving current depending on motion.

REFERENCE SIGNS LIST 100, 200 Liquid crystal display apparatus
110 Liquid crystal panel section
111 Liquid crystal panel
112 Source driver
113 Gate driver
114 Liquid crystal controller
120 Illuminating section
121 Light emitting section
122 LED
123 LED driver
130, 210 Drive control section
131 Motion amount detecting section
132 Brightness control section
133 Peak value determining section
134 Change control section
135 Duty determining section
136, 136a Scanning controller
211 Feature amount detecting section
212 Brightness command value determining section
213 Duty correcting section
141 Constant current circuit
142 Communication I/F
143 DAC
144 Switch
151 1-V Delay section
152 Macro block motion amount calculating section
153 Maximum value calculating section

161 Comparator
162 Limiter circuit
163 Adder
164 Latch circuit
165 V counter
171 Filter in direction of time

The invention claimed is:

1. A backlight apparatus comprising:
a light emitting section having a plurality of light emitting areas:
a motion amount detecting section that detects an amount of motion of an image in each of a plurality of moving areas corresponding to at least one of the light emitting areas;
a driving condition designating section that designates driving conditions including a duty and a peak value of a driving pulse to cause the plurality of light emitting areas to emit light based on the detected amount of motion;
a drive section that drives the plurality of light emitting areas according to the designated driving conditions;
a feature amount detecting section that detects a feature amount of an image signal for each of a plurality of brightness areas corresponding to at least one of the light emitting areas; and
a brightness command value determining section that determines a brightness command value for each of the plurality of brightness area based on the detected feature amount, wherein;
the driving condition designating section determines the peak value of the driving pulse for each of the plurality of light emitting areas based on the detected amount of motion, after the duty of the driving pulse is temporarily determined based on the determined peak value, the temporarily determined duty is corrected based on the determined brightness command value, to adjust the driving conditions such that the driving conditions change gradually with time; and
the drive section drives each of the plurality of light emitting areas according to the driving conditions including the determined peak value and the corrected duty.

2. The backlight apparatus according to claim 1, wherein the driving condition designating section adjusts the driving conditions such that, when the driving conditions are changed, a change in the peak value or the duty of the driving pulse in time and an updating cycle satisfy predetermined limitations, respectively, 3. The backlight apparatus according to claim 2, wherein the driving condition designating section has a change limiter that regulates a change, the change in the peak value or the duty of the driving pulse in time is suppressed within a predetermined limit by the change limiter.

4. The backlight apparatus according to claim 2, wherein the driving condition designating section has a filter in a direction of time, and the change in the peak value or the duty of the driving pulse in time is suppressed within a predetermined limit by the filter.

5. The backlight apparatus according to claim 2, wherein the driving condition designating section has an output updating interval setting section that sets an output updating interval, and the output updating interval is set by the output updating interval setting section to a V cycle of an image signal or an integral multiple of the V cycle to suppress the updating cycle within a predetermined limit.

6. The backlight apparatus according to claim 1, wherein the driving condition designating section designates the driving conditions such that one driving pulse corresponds to one frame cycle of the image signal for each of the plurality of light emitting areas.

7. The backlight apparatus according to claim 1, wherein the driving condition designating section has a scanning control section that controls a light emitting timing of the corresponding light emitting area in synchronism with scanning of an image for each of the plurality of scanning areas corresponding to at least one of the light emitting areas.

8. The backlight apparatus according to claim 1, wherein the light emitting section has a plurality of light emitting diodes as light sources.

9. A display apparatus comprising:
the backlight apparatus according to claim 1; and
a light modulating section that displays an image by modulating illumination lights from the plurality of light emitting areas depending on an image signal.

* * * * *